Sept. 19, 1961　　　V. STARK　　　3,000,190
APPARATUS AND WEARING APPAREL FOR BODY REFRIGERATION
Filed July 15, 1959　　　6 Sheets-Sheet 1

INVENTOR
Virgil Stark
BY
ATTORNEYS

Sept. 19, 1961 V. STARK 3,000,190
APPARATUS AND WEARING APPAREL FOR BODY REFRIGERATION
Filed July 15, 1959 6 Sheets-Sheet 3

INVENTOR
Virgil Stark
BY
ATTORNEYS

Sept. 19, 1961 V. STARK 3,000,190
APPARATUS AND WEARING APPAREL FOR BODY REFRIGERATION
Filed July 15, 1959 6 Sheets-Sheet 4

INVENTOR
Virgil Stark

BY

ATTORNEYS

Fig. 11.

Sept. 19, 1961 V. STARK 3,000,190
APPARATUS AND WEARING APPAREL FOR BODY REFRIGERATION
Filed July 15, 1959 6 Sheets-Sheet 6

INVENTOR.
Virgil Stark
BY
Holcombe, Wetherill & Brisebois
ATTORNEYS

United States Patent Office 3,000,190
Patented Sept. 19, 1961

3,000,190
APPARATUS AND WEARING APPAREL FOR BODY REFRIGERATION
Virgil Stark, 405 Lexington Ave., New York 17, N.Y.
Filed July 15, 1959, Ser. No. 827,349
21 Claims. (Cl. 62—259)

This invention relates to improvements in headgear and wearing apparel of the character disclosed in my patent No. 2,731,808, dated January 24, 1956, entitled "Refrigerated Clothing," and concerns the protection of the wearer's person from high ambient temperature and humidity by means of a self-contained air conditioner unit comprising one or more refrigerant storage chambers and air passages associated therewith communicating with the interior of an insulating garment.

In my patented garment the refrigerant storage capacity is limited, and the present invention aims to provide greater cooling effect and increased space for reserve refrigerant supply by positioning the refrigerant container around the head of the wearer, permitting both the head and the body to be cooled from the same source. A further aim is to provide additional cooling apparatus inside the garment surrounding the body at or below the shoulder line to supplement the apparatus carried on the head, hereinafter referred to generally as a helmet.

Briefly stated, the invention comprises two helmet type head covers, one within the other, having between them a space divided into compartments for holding a supply of refrigerant, such as Dry Ice, or frozen eutectic mixture, renewable from time to time as it is exhausted or melted, an internal non-metallic supporting means spaced within the inner cover for engaging the head of the wearer and an external rim spaced from the outer cover for supporting an outer hood surrounding the wearer's neck provided with a visor protecting the wearer's face, metallic fins between the rim and the outer edges of the inner and outer covers forming passages for cooling air entering the hood from around the outer cover and means for adjusting the area thereof, a central passage through the two covers at the peak of the helmet for admission of air and an adjustable cover or closure therefor, said closure cover when in place closing the peak opening of the annular space between said covers at the peak of the helmet and having adjustable openings for controlling the flow of air therethrough into said helmet, and flexible means such as straps riveted to the inside of the inner cover for supporting the entire assemblage upon the head of the wearer. Additional control of the rate of refrigeration may be supplied by strips of insulation between the inner sides of the covers and the space for the refrigerant and between the metallic bands supporting the fins and the lower part of the space for the refrigerant.

Further aims and advantages of the invention appear in connection with the following description of several illustrative embodiments thereof shown in the accompanying drawings, wherein:

FIG. 4 is a front elevation, and

FIG. 5 is a side elevation of a mannikin wearing a preferred form of apparel embodying a headgear of the type shown in FIGS. 1, 2 and 3, the upper part thereof being broken away to disclose the interior construction, the helmet being shown in cross-section on its two major axes, respectively;

FIG. 17 is a front elevation of a modification, partially cut away, showing the apparatus mounted on a mannikin:

Figure 1:
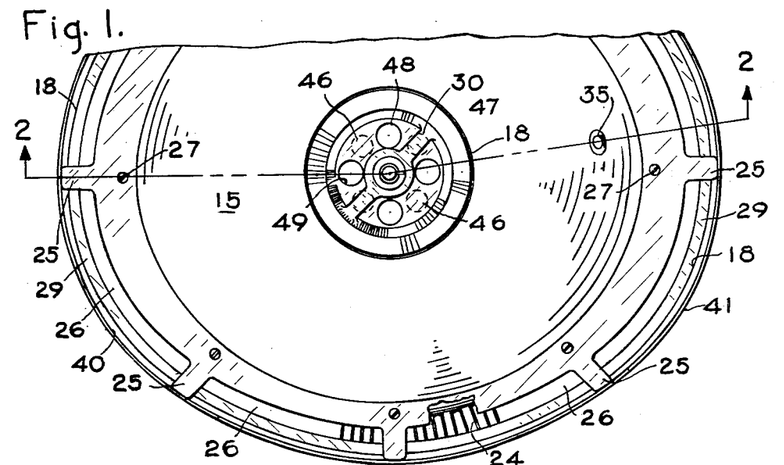
FIG. 1 is a top plan view of the assembled helmet type head covering, partly broken away.
Figures 2, 3:
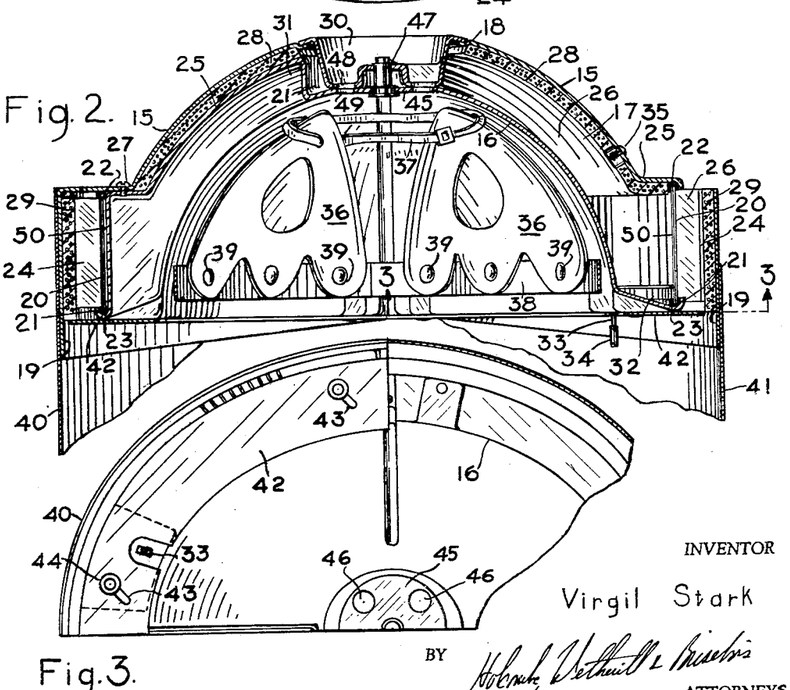
FIG. 2 is a vertical cross-section thereof on the line 2—2 of FIG. 1.
FIG. 3 is a fragmentary bottom plan view, partly in section, with the adjustable regular strip omitted for clarity of illustration, taken substantially on the line 3—3 of FIG. 2.

Referring to FIGS. 1, 2 and 3 of the drawings, the preferred design of refrigerating apparatus shown therein and which is typical of my present improvement includes headwear consisting of an outer helmet type cover 15 and an inner smaller cover 16 similar in its general shape to the outer cover and secured thereto to provide an interspace 17 which forms the container for the refrigerant charge. By suitably spacing and insulating the two covers as much as 5 lbs. of refrigerant may be securely stored between them, access thereto being through an opening 18 at the peak of the outer cover.

The outside cover 15 is provided with a flange or collar extension 19 and a metallic band 20, preferably of aluminum, is placed inside the out-turned lips 21 around the bottom edge of the inside container 16, parallel to and spaced from the collar extension 19 and securely held in place by U-shaped gaskets 22, 23, of neoprene or other suitable material. A large number of properly spaced metallic fins 24, preferably of aluminum, are attached, by cement, adhesive, spotwelding and/or dip brazing, on the band 20 in the space between it and the collar extension 19 not occupied by insulation as herewith described. Ambient warm air is allowed to flow through the large openings separated by the hollow ribs 25 into the interspace 26 between the metallic fins, where it is cooled, and thence flows downwardly into the space below the helmet.

The refrigerant space 17 in the top of the helmet between outside cover 15 and inside cover 16 is preferably separated into several compartments by the spaced hollow ribs 25, formed in the inner cover, which allow the proper distribution of the refrigerant and retain it in place, even if the wearer is moving his head or the helmet is worn in an inclined position. These ribs also provide for the supporting and fixing of the outside cover to the inside one preferably by panhead screws 27. Insulation against heat, preferably in sheets of suitable foam, 28, 29, is provided on the inside of outside cover 15 and within the collar extension 19.

A removable cover 30 is provided to close the space between the covers 15, 16 at the peak opening 18 to enclose the charge of refrigerant which may be placed in the container space 17. Spaces 31, 32 for vapor circulation and water drainage are provided between the ribs 25 and the metallic band 20 and also between the top portion of the helmet and the removable cover. This cover and the gaskets 22, 23 around the top and bottom of the metallic band 20 effectively seal the refrigerant compartment and prevent the escape of vapor except where provided for. An adjustable vapor escape passage leads from the refrigerant compartment 17 and also a drain 33 is provided with preferably a drain tube 34 forming a conduit for discharging condensation into a sponge or other suitable receptacle. An adjustable escape valve 35 may preferably be installed on a wall of the helmet so as to allow a certain small pressure (up to 5 p.s.i.g., for instance) to be formed in the container space, if desired.

An inside suspension headpiece 36, 37 and 38, preferably made out of pie-shaped segments 36 connected at their upper corners by an adjustable strap 37 and secured at their lower edges to an adjustable plastic strip 38 for covering the head of the wearer and supporting the helmet, is fixed by snap eyelets or buttons 39 or other suitable attachments at spaced points on the inside cover 16, allowing a free space between the head and the helmet for circulation of air. An adjustable chin strap may also be provided to fit beneath the contour of the chin and retain the helmet on the head in a more stable manner.

A transparent visor 40, removable and adjustable, will preferably extend from the outer cover in front, and will allow the cool air under the helmet to flow around the face of the wearer. A detachable hood or skirt 41 of insulating material, which can extend preferably to just around the shoulder line (allowing outlet of air) will conduct the flow of air around the neck of the wearer.

Several adjustable regulator strips 42 formed with slots 43 for horizontal adjustment, will preferably be provided, movable preferably on tension mounting device 44 to allow the regulation of flow of air through the spaces 26 between the metallic fins 24 by opening or covering such spaces and thus controlling the refrigeration effect as desired.

Another refrigeration regulating device 45 is preferably provided in the top cover 30 comprising openings 46 turning around the fastener 47. The openings 48 in such cover 30 may be rotated to close or open partially or totally with corresponding openings 49 arranged in the inside cover of the helmet.

A third regulating device consists of insulating sheets 50, which may be placed, if so desired, behind the metallic band 20, outside of the inside cover 16 and spaced therefrom so as to reduce the heat transfer between the refrigerant space 26 and the fins 24 and thus control the refrigeration effect.

The refrigerating headwear, as described above, will operate as follows:

There will be two streams of cooled air flowing into the space below the helmet. The first flow will result from the cooling of the warm ambient air by the metallic fins which will be kept at low temperatures by the refrigerant (Dry Ice or frozen eutectic mixture for instance) which will refrigerate the metallic band on which the fins are mounted. The refrigerant will cool the metallic fins to 35° F. for instance, which will cool the ambient air from 125° F. for instance, to 50° F. The air at 50° F. being heavier than the ambient air at 125° F. will flow downwardly and cool the face and neck of the wearer to a comfortable degree.

The air thus flowing will be gradually heated however, by the heat developed by the body of the wearer and by the ambience (insulated, however by skirt and visor).

The second flow of air will be produced by the cooling of the inside of the helmet by the refrigerant to 60° F. for instance. The air between the head and the inside of the helmet will be thus cooled and absorb the heat developed by the head. The cooled air will flow downwardly and cool the head and the neck of the wearer.

The first air flow may be regulated by either of the above devices, that is, the sliding covers 42 or sheet cover 50, and the second air flow by either the rotating device 45 or by adjusting the inner headcover suspension means to provide more or less space between the top of the wearer's head and the helmet.

Another feature of the invention operates to permit part or all of the first air flow resulting from the cooling by the fins to flow down to an insulated garmet properly spaced from the body preferably by properly located ribs so as to cool the body by lowering the temperature in the intermediate space between the body and the garment.

Figures 4, 5:
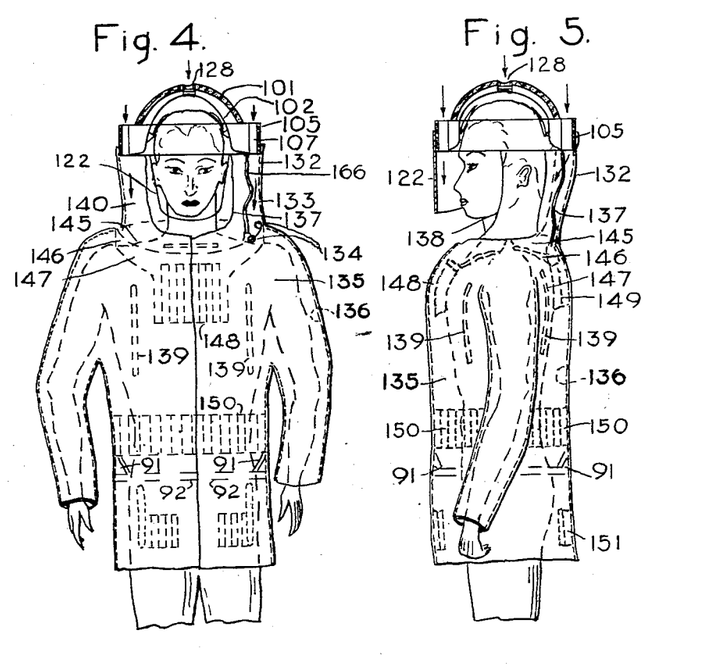
Figure 6:
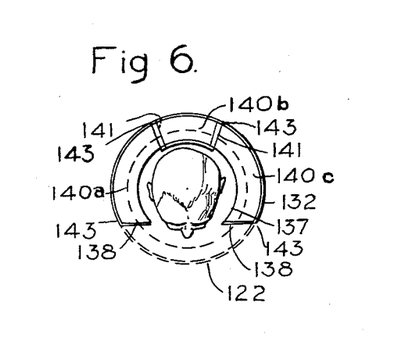
FIG. 6 is a plan view of the manniken and upper part of the apparel as shown in FIGS. 4 and 5, with the helmet removed.

The second air flow will cool the neck of the wearer and intermingle to some extent with part of the first flow cooled by the fins so as to cool the face, and if desired part of the neck, as illustrated in FIGS. 4, 5 and 6, which show a preferred design of neck protectors and body apparel for use with the headwear described.

FIG. 4 shows a front view and FIG. 5 shows a side view of a mannikin wearing the double helmet type headwear as previously described, having an outer cover 101 and an inner cover 102 on the collar 105 covering the metallic fins 107, a detachable loose skirt or hood 132, preferably lined with insulating material 133 is attached. The bottom of the skirt it attached preferably by detachable means, such as snaps 134 to a long garment 135 lined with insulating material 136 and spaced from the body by proper ribs 139, or to a shorter garment spaced from the body and covering only the shoulder or extended to any other part of the body such as the chestline or waist.

An inside loose skirt 137 is attached, preferably by a detachable method, to the bottom of the inside helmet type cover 102. The skirt 137 ends in front of the earline of the wearer 138 on both sides so as to leave the face free and allow space to attach a visor 122 constituting a protection shield for the wearer. The space 140 between the outer skirt 132 and the inner skirt 137 will conduct the air cooled by the fins into the interspace between the garment and the body.

Such space 140 is preferably divided into compartments by the loose separations 141 and preferably in three compartments 140a, 140b, 140c, exemplified as shown in FIG. 6. The separations 141 and 138 will be preferably made of a double loose fabric or one fabric with insert covers in which a series of flexible hard elements 143 such as plastic strips may be inserted so as to keep the skirts apart and the circulation cross-section free when the wearer is turning his head.

The rear bottom part 144 of the inside skirt 137 will preferably be made detachable from the rest of the skirt 137 so as to direct, if so desired, the cool air from the back compartment 140b around the bottom part of the neck to further cool the neck instead of conducting such cooled air to the garment which then will receive only the cold air from the other compartments 140a and 140c.

The cooled air from the helmet will flow through the free spaces 140 limited by the skirts 132, 137 to a distribution compartment 145 provided above the shoulder line. The garment 135 will be kept above the shoulder line by a proper support 146 made out of plastic, for instance, and which preferably may be part of an inner flexible yoke or vest 147 made out of plastic, for instance, which can be placed all around the upper part of the body passing over the shoulder line.

A device consisting of springs 166 can be applied to the charged helmet to reduce the weight thereof. Each spring may be regulated to the desired strength and may be fixed at its bottom and to the yoke 147 and at its top and to the helmet, both secured preferably through a swivel support. The number of spring supports will be preferably three, one at the back and one on each side, so as to allow the turning and movements of the head. They will transfer to the body part of the weight of the helmet relieving in this way the weight on the head.

Another device consists of a shorter insulated garment having a bottom end piece adapted to be attached to the garment lining on one side and to the wearer around the waistline on the other side, said garment being spaced from the body by proper ribs which can fit near the waistline so to close the outlet at hemline of the garment, such as round ribs 91 (FIGS. 4 and 5) which keep a closed space available at the bottom. In such space a number of back pressure type valves or one-way valves (92), are provided preferably made of plastic, similar to the ones used in oxygen masks, which will allow a flow of air to the outside of the intermediate environment between the garment and the body but will not allow warm air from outside to enter into such space. This device can also be incorporated in a longer garment with an attachment added to the inside lining so as to allow, if desirable, the closing of the outlet spacing except through the back pressure valve incorporated at the hemline in such device. This device will be of assistance in very hot environments where an upward flow of hot air is experienced which might otherwise partially counteract the downward flow of cold air.

If additional cooling is required especially for higher ambient temperatures, then additional refrigerating units may be installed inside the garment and spaced from the body.

Such refrigeration units could be placed in front at the chestline 148 and in the back at 149. Additional units, attached to a belt preferably, in form of a band 150 may be placed at the waistline. If so required additional units may be placed near the hemline 151 above the open bottom or hem of the garment.

Above such refrigerating units, adjustable openings 196 may be made in the garment so as to allow air in addition to the flow from the helmet to be admitted for cooling into the garment.

Figure 7:
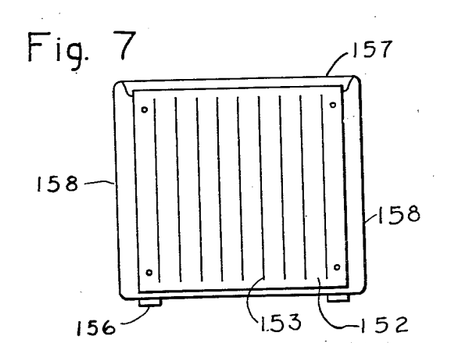
FIGS. 7, 8 and 9 are a front elevation, side elevation and top plan view, respectively, of a preferred form of refrigerating unit for use with apparel such as described in connection with FIGS. 4, 5 and 6.
Figure 8:
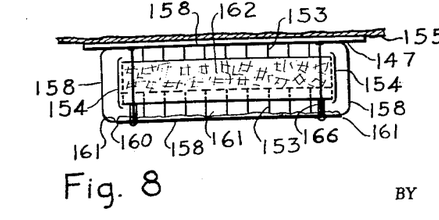
Figure 9:
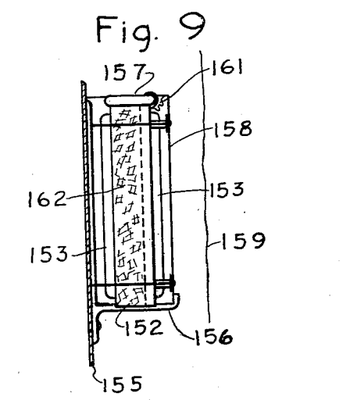

The refrigerating unit described above, is illustrated as a preferred design in FIG. 7 showing a front view, FIG. 8 showing a plan view, and FIG. 9 a side view. The container 152 is provided with fins 153 preferably to both sides of such container. Such container will preferably have the side walls made of flexible, insulated and rubber-lined fabric 154.

The finned refrigerating container filled with a rechargeable charge of refrigerant will be properly attached either to the plastic yoke 147 or to the inside of the lined garment 135 with a proper support 156 at the bottom. A suitable cover 157 at the top will allow the filling with refrigerant charge.

The finned container will be preferably housed in a cover made of insulating material 158 and the side facing the body will preferably be made out of plastic and foam insulation so as to avoid contact of the cold fin 153 with the skin of the body 159. The front wall of the container carrying the fins will preferably be made movable, and is pushed by springs 160 installed around a shaft fixed on the two outside walls of the cover 158.

This will allow the refrigerant 162 to be in close contact with the metallic walls of the finned container which will allow a better heat transfer and higher refrigeration effect. The movement of the finned wall will be made possible by the loose flexible rubber lined fabric side walls.

A loose fabric 161 may be preferably attached to the top end of the fins so as to direct all air flow to the interspace between the fins for a more efficient cooling.

Figure 10:
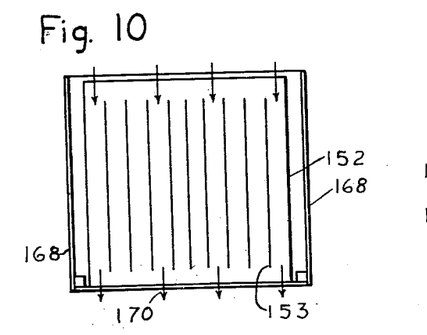
FIGS. 10, 11 and 12 are respectively a front elevation, side elevation, and top plan view of a modified form of refrigerating unit.
Figure 11:
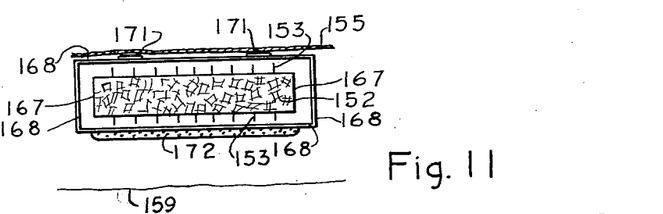
Figure 12:
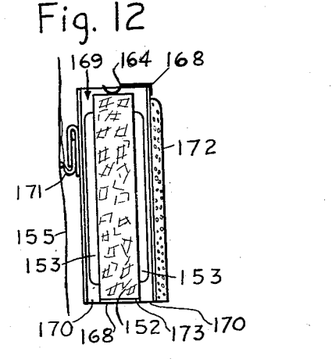

Another simpler design for the refrigerating units is shown in FIGS. 10, 11 and 12. The finned container 152 has all the walls, including the lateral walls 167, made out of metal such as aluminum and can be placed preferably in a box 168 made from plastic, for instance, with open top and openings 169 at bottom 170 for free passage of air. Such box can be attached in a detachable way by proper clips or snap fasteners 171 either to the lining of the garment 155 or to the yoke 147 or to the belt 150. It may be provided with additional insulation 172 such as foam on one of the outside walls facing the body so that the unit is not only kept distant from the body 159 but is properly insulated to avoid any ill effects from possible local low temperature points.

A preferable design is to have the metallic finned container with one opening having a screw type cap 173 provided for filling with refrigerant. When both the plastic box 168 and the metallic container 152 are taken out of the garment, then the refrigerant can be charged in the containers 152 with the opening 173 upwards. After filling, the outside box may be placed in the enclosed metallic container and a movable spring type fastener 164 may be strapped in proper position so as to press the container on the plastic box, or a screw type fastener held by a removable strip supported at both ends by the box may be used to produce this effect. Then the outfit will be turned in appropriate direction and thereafter inserted in the garment. A proper gasket 165 will preferably be provided to assure tight connection between the container and the box.

Provision will preferably be made for equipping all refrigerating units of the head apparel and inside the garment with suitable inclined surfaces and collection drains fitted with plastic tubes so as to allow the condensed water to be collected and drained, into a sponge type foam from which the water can be squeezed out periodically.

Figure 13:
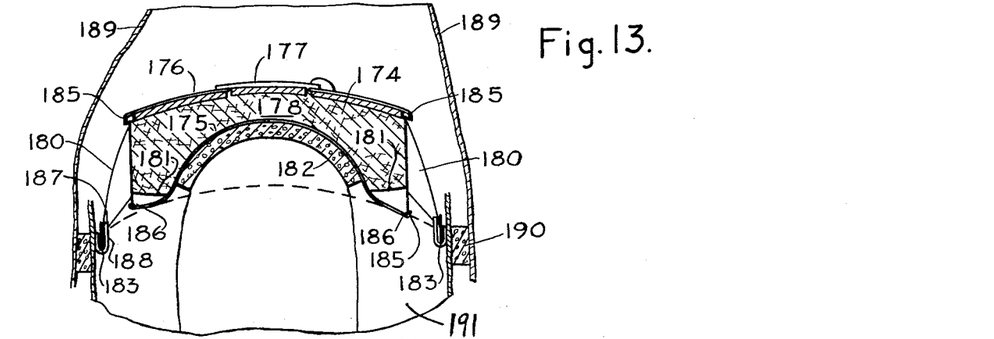
FIG. 13 is a vertical axial section from front to rear of a shoulder mounted refrigerating unit of my invention.
Figure 14:
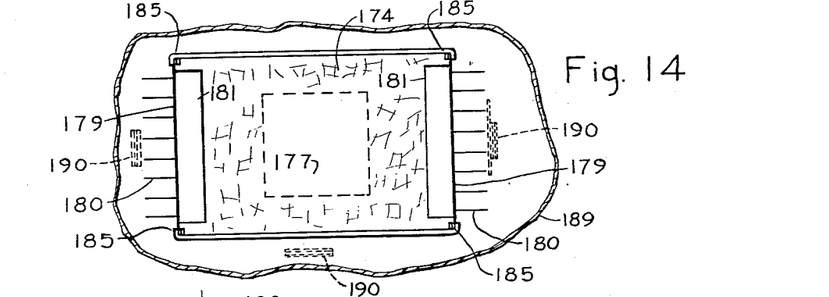
FIG. 14 is a plan view thereof.

Another device utilizing my refrigerating units is shown in FIG. 13 and FIG. 14, depicting a design for units to be placed on the shoulder line and used for high ambient temperatures or when low body temperatures are required. It consists of a container 174 to be filled with a replaceable charge of refrigerant such as Dry Ice or frozen eutectic mixture and preferably made out of plastic material. It will preferably have a bottom 175 in the shape of a saddle to fit the contour of the shoulder line and a top 176 provided with an opening over which a movable cover 177 will fit. The top and the cover will preferably be lined with an insulating material 178, such as foam, when the refrigerating unit is exposed to the ambient air.

The lateral walls of the container will also be made out of plastic. The free sides of the container in front and back of the wearer will be provided with detachable plates of metal 179 preferably made of aluminum, and a large number of fins 180 made of aluminum, for instance, and attached to the metal plates 179 preferably by adhesive, cement, spot-welding or dip-brazing or extrusion. The finned metal plate is inserted in a protective housing 185 being part of the plastic container and forming the two lateral end walls of such container filled with refrigerant. Proper gaskets 186 are provided at the bottom and top of the metallic plates 179 so as to keep tight the container filled with refrigerant.

An extension placed inside the container and made out of metal is preferably attached to the bottom of the metallic plate carrying the fins so as to increase the transfer area from refrigerant to the plate and the fins.

The container will be suspended on the shoulder of the wearer and be spaced from the shoulder by insulating material 182 which is attached preferably by cementing to the plastic bottom of the container. The refrigerating unit can be attached to the lining of the fabric by properly inserting it in a pocket 191 provided in the lining of the fabric and allowing the spacing of the garment from the body to permit the air to flow freely from the finned area to the environment between the body and the garment.

Provisions will be made to collect condensed water at the end of the finline 187 with an extension 183 provided with a plastic tube 188 to carry away the condensed water preferably to be absorbed in sponge material removably attached to the lining of the garment.

Such a refrigerating unit may receive either warm air from the ambience to be conducted after cooling into the space between the insulated garment and the body, or it may be placed under a proper hood 189 conducting air already cooled by the refrigerated helmet into the refrigerating units placed above the shoulder. The air may thereafter be further cooled by other refrigerating units placed inside the garment as previously shown and will allow increased cooling for high temperature ambiences.

This hood or garment may be spaced from the body by suitable ribs 190. This refrigerating unit will have the advantage of providing a large space for the refrigerating charge to be placed at a small distance from the upper shoulder line thus allowing free movement of the arms without hitting the head which might otherwise occur when a high container space is provided above the shoulder line.

Figures 15, 16:
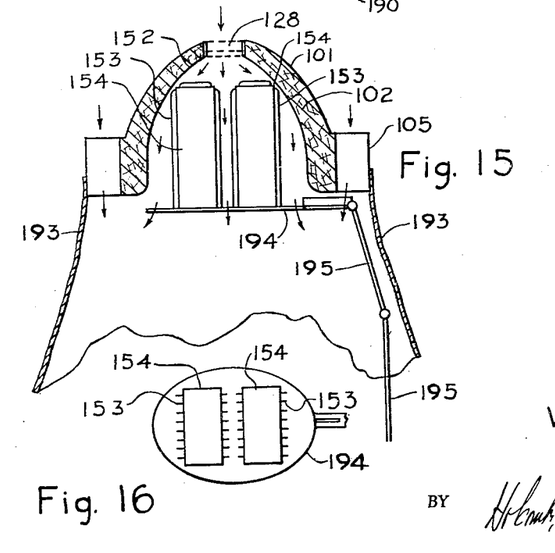
FIG. 15 is a vertical cross-section from front to rear of a headgear mounted on a stationary support for cooling the space within a tentlike canopy supported thereby.
FIG. 16 is a plan view of the supplemental refrigerating units that may be used therewith.

Another device is shown in FIG. 15 and FIG. 16. This device provides for using the double helmet 101, 102, preferably together with part of the refrigerating units 154 detached from the garment and placed inside the inner helmet 102, so as to cool a space confined by an insulating lined cape or cover 193, preferably attached to the outside collar 105 of the helmet. In this way, the wearer can take off the helmet and refrigerating units and use it to cool a space such as a tent, a bed, or a small enclosure, during times that he is not moving.

The ambient warm air will flow on one side through the finned area and be cooled by the refrigerated fins and on the other side a secondary warm air will flow through the opening 128 on top of the helmet and be cooled on one side by the fins 153 of the refrigerating units 154 placed inside the helmet and on the other side by the cold surfaces of the inside helmet 102. A support 194 preferably provided with linked rods or tubes 195 will permit placement of the apparel above the confined space to be cooled.

This invention will provide greater protection from external conditions, more efficient refrigeration, a longer duration for the refrigerant charge and a better cooling for comfort in hot and humid environments than any other known type of apparatus for these purposes.

The air leaving the finned area of the helmet and cooled from 125° F. to 50° F. for instance will not be efficiently used if such cold air mingles with and is warmed by the ambient air. It is advantageous that the air which is cooled (even if slightly warmed by the face or neck of the wearer) thereafter be used for the cooling of the body. In this way, the refrigerant is more efficiently used. The double flow of air, as above indicated, will cool more efficiently the head, face and neck of the wearer. The reserve of refrigerant will be substantially increased by the much larger capacity of the helmet compartment so that the replacement will be required at longer periods of time. The different regulating devices will allow for better regulation of the cooling, save refrigerant, and increase length of cooling cycle.

The provision for installation of refrigerating units above the hemline of the garment will permit cooling any ambient air which will have a tendency to rise in very high ambient temperatures and counteract such an upflow of hot air which may otherwise reduce the downward flow of cold air produced by gravity differences.

The preferred refrigerant is Dry Ice or eutectic salt solutions and the apparatus for cooling is designed especially for such refrigerants. It has been found, however, that while Dry Ice has important advantages as a refrigerant such as low temperature of sublimation ($-109°$ F.) and high refrigeration capacity per unit weight, it has also disadvantages such as danger of concentration in enclosed areas and non-availability in certain countries.

Furthermore, the cooling effect using solid $CO_2$ results from the solid Dry Ice being in direct contact with the metal surface bearing the fins. As the gaseous $CO_2$ decreases, the contact surface between solid $CO_2$ and metal also decreases. This decrease of contact surface between $CO_2$ and metal gradually decrease the total cooling surface and despite the very low temperature of sublimation of the $CO_2$ the cooling efficiency rapidly decreases as not enough cooling surface is available to cool the warm air passing over the fins.

This invention comprises an improvement which largely eliminates the above cited shortcomings through the employment of other types of refrigerant and different or improved apparatus, and/or garments, and/or headwear for its application obtaining comfort for human beings in hot and/or humid environments of approximately 100° F. to 200° F.

Further improvements and new features are also shown in this invention for the portable and/or fixed cooling systems and apparatus. The refrigerant preferably employed consists of an eutectic solution composed of water, various salts and an alcohol or glycol.

The cooling effect of such a composite mixture is the result of various endothermic phenomena which take place when such a frozen mixture absorbs heat. Distinct sources of cooling effect can be generated from the following:

(1) The sensible or specific heat of the substance supercooled below its freezing point is the heat necessary to raise the temperature of the solid to the melting point.

(2) The heat of fusion (which is the amount of heat in cal-gram necessary to produce changes from the solid to liquid without change in the temperature).

(3) The negative heat of solution of the soluble salts in liquids such as water or alcohol. During freezing of the salt solution, the hydrated salt separates from the frozen solution. When liquid is formed from the unfrozen solution during melting, the salt will redissolve in the liquid absorbing the negative heat of solution generated during this process and resulting in an additional refrigeration.

(4) The specific heat of the solution from the melting point up to the point at which no significant cooling of the incoming air is obtained.

(5) Another optional source of refrigeration consists of solid carbon dioxide (Dry Ice) added to an eutectic mixture composed of water, various salts, and alcohol or glycerol, the refrigeration being obtained from the heat absorbed resulting from the sublimation of the solid carbon dioxide.

The mixture can be composed of either one or several of the following:

(a) Water or sea-water;

(b) A water soluble organic compound having the ability to reduce the freezing point of the water such as for example methanol, ethylalcohol, isopropylalcohol, ethylene glycol, glycerol and others;

(c) Salts soluble in (a) and/or (b) or mixture of both having a negative heat of solution which also lowers the temperature of melting of (a) such as:

Sodium carbonate decahydrate
Sodium thiosulfate pentahydrate
Sodium sulfate decahydrate
Sodium acetate
Ammonium nitrate
Calcium chloride hexahydrate
Potassium thiocyanate, etc.

(d) For very high ambient temperatures or other special conditions requiring extreme cooling, Dry Ice may be used.

The presence of (c) in the solution will also have the effect to lower the temperature of fusion with or without (b).

A typical example of such a cooling mixture in percentages of weight is as follows:

65% sea-water
10% denatured ethyl-alcohol
25% ammonium nitrate

This solution freezes at $-10°$ F. but can be undercooled to $-35°$ F., for instance. The combined reserve of refrigeration for above is approximately 200 B.t.u./lb.

The new feature of the above type of refrigerant applied to the cooling apparatus for hot ambient temperatures is the way in which the absorption of heat from the ambient air occurs. The frozen solid mixture after absorbing heat (from the subcooling temperature to the temperature of melting) starts to melt and a layer of liquid is formed around the solid having approximately the same temperature as the temperature of fusion of the solid. Such layer of liquid is mostly in contact with the metallic band to which the fins are bonded and through which the ambient air is cooled. As the solid is melting, the salts (c) which were separated during freezing are starting to dissolve in the available liquid formed by the melting. This process of dissolution absorbs heat and delays therefore the process of melting which requires heat. The result is that the period of time required for the melting is extended, the melting proceeds at constant temperature which is low, the duration of practical usage of such a refrigerant in the cooling apparatus is also extended which is of special advantage and interest for such cooling device.

For the above-described refrigerant and conditions and, for instance, for an ambient temperature of 125° F. at a melting temperature of approximately −10° F. according to experiments conducted with headwear described hereafter, and with direct contact of the mixture with the finned plate, the temperature of the fins will be approximately 45° F. The temperature under the fins will be approximately 50° F., which represents approximately 75° F. cooling of the ambient air.

For ambient temperatures higher than 125° F., the components of the mixture may be varied so as to allow a lower temperature of melting which may be as low as −80° F. The temperature of the fins will then be lower and allow a larger temperature difference between the cooled air and the ambient air.

The mixture can be frozen either directly in the container of the headwear or in the container placed inside the garment. In this case, the solid frozen mixture will be in direct contact with the backplate carrying the fins. As an alternate possibility such mixture can be frozen in one or several separate cartridges made either of thin aluminum and/or plastic or a plastic bag and placed in the cooling apparatus, removed when used and then replaced by another cartridge containing the frozen mixture.

The refrigeration apparatus carrying a frozen refrigerant that melts into a liquid presents new features, as compared with the one using Dry Ice described above, as hereinafter described.

Figures 18, 19:
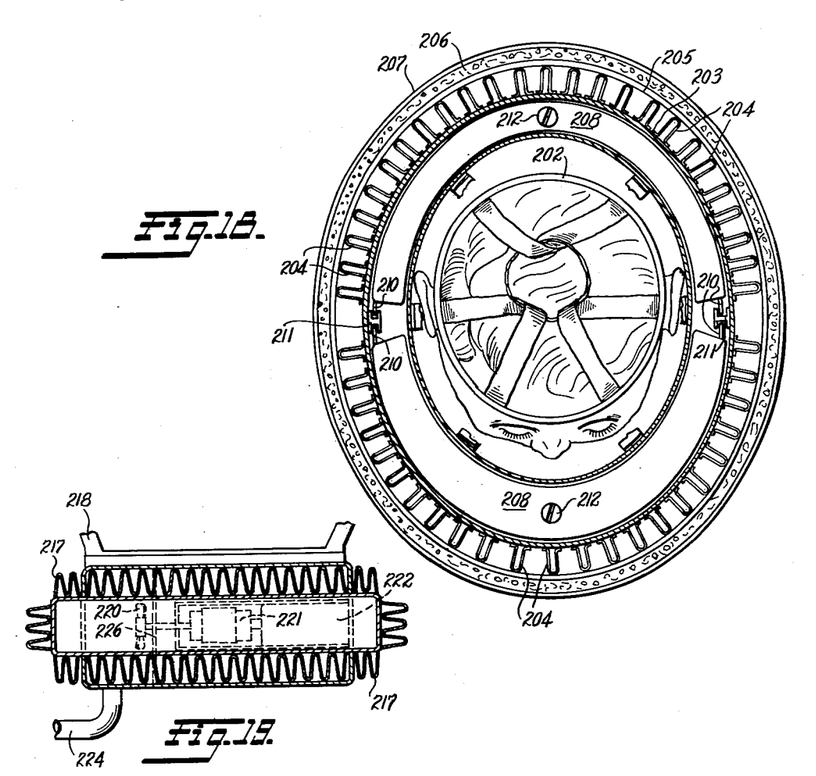
FIG. 18 is a sectional view on line 18—18 of FIG. 17.
FIG. 19 is a sectional view on line 19—19 of FIG. 17.

For the headwear (see FIGS. 17 and 18) a helmet 201, preferably in light-gauge aluminum instead of plastic, has been selected as a better heat conductor, allowing the air above the head of the wearer to cool. The head band 202 spaces the helmet from the head, so air cooled by the aluminum helmet will circulate around the head. The aluminum plate 203 has fins 204 bonded on it, which fins are preferably made out of a corrugated aluminum sheet, as shown in FIG. 18. A protecting plate 205, insulation 206 and hood 207 are provided.

The space between the lower part of the helmet 201 and the plate 203 forms the container for the refrigerant. It either can be closed by a cover 209 cemented to the helmet 201 and the aluminum plate 203, or removable cartridges 208 with fitter plugs, as shown in FIGS. 17 and 18, can be placed in such space. The cartridges should be in good contact with the plate 203, and for this reason they are provided with extensions 210 which slide in tracks 211 and are preferably held in place by a spring 212. A removable foam insulation 213, either aluminum sprayed or covered with aluminized material 214, preferably snapped on plate 203 may be provided, on top. Instead of a helmet, a band can be used on which the cartridges, preferably of aluminum, are attached. Such cartridges can also be provided with metallic fins directly bonded to them, thus eliminating the backplate.

Figure 20:
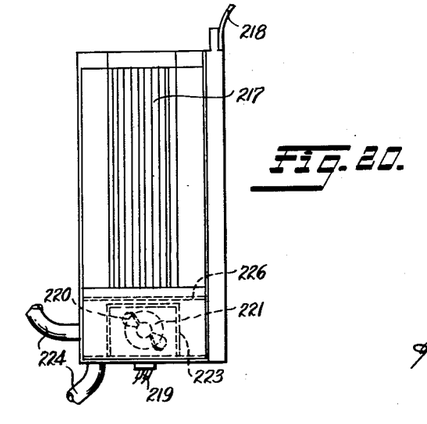
FIG. 20 is a sectional view on line 20—20 of FIG. 17.

The cooling apparatus to be placed on the chest, back, or waist as shown in FIGS. 17, 19 and 20 have removable aluminum or plastic cartridges 216 filled with the cooling mixture placed in the cooling apparatus formed by the finned plates 217 or the metallic box of the cooling apparatus with the fins can be used as a removable container to be replaced by another box after use. A plastic support 218, preferably hanging from the shoulder for the chest and back units, and a belt for the waist units, to which such cooling apparatus is detachably secured thus making it removable as desired, complete this form of apparatus.

An optional feature is provided for such cooling apparatus to be placed around the body in the form of a closed chamber 225, collecting either part or all of the cooled air. Such cooled air (to 50° F., for instance) may then be blown by a small fan 220 driven by a small electric motor 221 with replaceable battery 222 preferably in an enclosure 223 through a flexible tube 224 to selected parts of the body such as head, neck, arms etc. A manifold 227, preferably out of plastic, preferably of a round flexible tube, with orifices out of which the cold air is expelled, can be used at the end of such flexible tubes, especially when cooling the head or under the arms. Such collection chamber with fan can be vertically or horizontally placed as shown in FIG. 17. In case that it is placed horizontally, a separation plate 226, allowing the proper conduction of the cooled air to the outlets without back pressure risk, is provided. This feature may eliminate in certain cases the necessity of a cooling apparatus on the headwear.

This feature comprising the blowing of cold air can be used in very high temperature ambiences combined with closing the inlet of the outside air. The aluminized insulated clothing or even asbestos of modified existing garments for very high temperatures can completely surround the body, being spaced from the body and headwear by ribs preferably of plastic foam. The air inside such enclosure can then circulate, the cooled air flowing downwardly and the air warmed by the body, upwardly. One or several small inlets and outlets can be preferably provided allowing additional air for respiration requirements. Air for respiration may also be provided separately by special apparatus, such as, respiratory apparatus, in which the inlet air can be preferably cooled through one of the cooling apparatuses containing the refrigerant, and blown to the respiratory apparatus.

The removable cartridges or bags containing the refrigerant described above have the advantage that their liquid content can be more rapidly frozen either in a deep freeze, or ice cream box when the melting temperatures are above −10° F. for instance, or in a Dry Ice box for lower temperatures. However, they can be frozen at a central location in larger numbers and then carried to the field of operation in smaller insulated boxes which keep them frozen for a longer time, such as 12 hours or more. Smaller insulated boxes containing such cartridges can even be carried by the individual for cartridge replacement purposes.

The advantages of the above improvements and new features as compared with the Dry Ice as refrigerant and the respective apparatuses covered by previous patents or applications for patents are as follows:

(1) It allows the use of a refrigerant at higher temperature nearer to 0° F. as compared with −109° F. for Dry Ice and becomes independent of Dry Ice in areas where Dry Ice is not readily available. The proposed mixture can consist of a variety of components more readily available at lower cost than Dry Ice.

(2) More even heat transfer is achieved if the container is filled with the frozen mixture or liquid than when Dry Ice is used.

(3) The frozen mixture for the liquid resulting during melting is in contact with all the surfaces available of the aluminum finned back plate, whereas when Dry Ice is used in the container, the solid Dry Ice is dwindling as it evaporates so that the surface of contact is gradually decreasing down to nothing.

(4) As a consequence of the above, the temperature of the fins can be kept more constant and better distributed over the cooling surface, allowing the air to be cooled, for instance, from 125° F. to 50° F., that is by 75° F., and the temperature difference between the air and the fins be only a few degrees (5 to 10° F.).

(5) It eliminates the production of $CO_2$ vapor when Dry Ice is used, and the requirements for a tight container, disposal of vapor and risks involved in cases with enclosed environments which do not allow accumulation of $CO_2$ vapor in excess of 3% which is the maximum acceptable amount.

(6) It allows variation of the temperature of cooling as low as −80° F. by selecting different components or the percentages thereof in the mixture thus obtaining comfortable conditions in ambiences of temperatures from 100° F. to 200° F.

(7) The weight of the headwear may be reduced substantially as compared with the one required for Dry Ice and the design of the apparatus has new improved features.

(8) The helmet may be made of aluminum which, when the border is filled with refrigerant the top will be cooled by heat transfer, thus cooling the air around the head. This was not possible when Dry Ice was used, as the temperature was too low to allow the use of a metallic helmet, which would have resulted in unacceptable low temperatures over the head.

(9) It allows a better distribution when the optional blowing of cooled air is provided which eventually may dispense with the use of the regrigerated headwear.

(10) The regrigerant may be frozen at a central location and contained in removable cartridges and carried in insulated boxes which is more feasible for higher temperatures than for Dry Ice (−109° F.).

The addition of regrigerating units inside the garment will allow a better refrigeration of the body in very warm environment. It will also allow a better appearance than the garment provided with the shoulder type units as shown in my Patent No. 2,731,808.

The device, possibly combined with the shoulder units, may find a special application in the medical field where it is desired to reduce the temperature of the body to low levels required for surgical operations, hemorrhages, etc.

The arrangement for separating the apparel from the body and using it for cooling a confined space may be of interest for obtaining cooling during rest time, at night, in tents, tanks for armed forces, air planes, and other uses of temporary nature.

This application is a continuation-in-part of my copending application Serial No. 637,573, filed January 31, 1957 now abandoned.

The invention is not restricted to the exact constructional details of the several embodiments illustrated, but what I desire to secure by Letters Patent is as follows.

What is claimed is:

1. A refrigerating head apparel consisting of two helmet-type covers, one secured inside the other, having between them a space divided into several compartments by means of ribs formed on at least one of said covers, a solid refrigerant in said compartment, said outer cover having a filling opening normally covered by a removable closure, an adjustable opening in said outer cover to permit access of ambient air to said space, an adjustable head support spaced within said inner cover and secured thereto and adapted to be placed around the head of the wearer to support the apparatus on the head spaced from the inside cover, a metallic band encircling the space between the bottom edges of the cover portions and secured thereto, said band supporting a large number of vertically disposed metallic fins in heat conducting relation to said space whereby the fins may be cooled to low temperatures by the refrigerant and in turn cool the warm ambient air which will flow down through the spaces between the fins by thermo-gravitational effect and mingle with the air flowing around the head within the inside cover which also is cooled by the refrigerant charge, both flows of air cooling the head, said apparel also having conduit means to catch and remove any water which may condense on the fins.

2. An apparel according to claim 1, provided with a device for regulating the refrigeration effect, comprising a plurality of sliding strips, providing one or more sliding strips each with parallel slots and movable individually on tension mounting devices placed at the bottom of the inside cover to partially cover the free space between the fins through which the cooled air flows so as to vary the volume of the air and its cooling.

3. An apparel according to claim 1, with a regulating device comprising a rotating charging cover provided at the bottom with openings which can be adjusted in position with respect to openings to the atmosphere at the top of the inside helmet type cover to admit a controlled amount of outside air into the space between the wearer's head and the surface of the inside helmet type cover cooled by the refrigerant, thereby regulating the temperature of the ambience around the top part of the wearer's head if the temperature of cooling is too low.

4. An apparel according to claim 1, provided with a hood extension to conduct part of the air cooled by the refrigerant charge to an intermediate environment between the body and an insulated garment spaced from the body by proper ribs, such hood extension consisting of an outside loose skirt insulated by suitable lining means and an inside loose skirt, such hood being separated into several compartments by loose fabric separation provided with flexible inserts keeping the outer skirt distant from the inside skirt to allow the flow of the cooled air and having the back of the inside skirt detachable, which device will conduct part of the air cooled by the fins of the head apparel into the space between the garment and the body, allowing the body to cool and using the second air flow cooled by the surface of the inside cover and part of the first air flow cooled by the fins to cool the face and the neck with provision for a free compartment above the shoulder line of the wearer spaced from the shoulder by a light weight support comprising in part a detachable yoke worn as a low collar at the upper chestline and upper backline, such compartment aiding the effective distribution of the cooled air flowing from the head apparel into the spaces between the garment and the body for proper distribution around the body.

5. An apparel according to claim 1, provided with suspension type springs to partially support the weight of the head apparel filled with refrigerant on the body proper, one end of each spring being attached to a yoke adapted to be mounted on the shoulder and upper chest and back of the wearer and the other end attached to the helmet bottom, both ends being provided with swivel connections allowing free movements of the head.

6. Apparel for cooling of the body consisting of an insulated garment having openings at different levels and provided with inside ribs adapted to space it from the body of a wearer, said garment having a plurality of refrigerating units inside it placed at different locations with respect to said body, each refrigerating unit consisting of a metallic container adapted to be filled with a replaceable, reusable charge of refrigerant and provided with metallic fins and insulation material on its side wall facing said body when being worn, and an enclosure surrounding and spaced from said finned container allowing flow of air around the fins, supporting means for the container with its surrounding enclosure permitting detaching of said container for replenishing its charge, said supporting means including a member encircling a portion of said body and spacers engaging said body preventing contact between it and said container insulating means, means for collecting and draining condensed water vapor from said fins and means within said apparel permitting controlled access of air to said units including both already cooled air from a refrigerating unit at a higher level and ambient air through said openings, thereby providing effective cooling of the body for all purposes including medical applications and surgical operations.

7. A refrigerating unit for wearing apparel having a container for refrigerant provided with a movable finned metallic wall connected with another fixed finned metallic wall by means of loose, insulation lined, side wall elements, a plurality of springs acting on said movable wall to keep the refrigerant charge in the container in close heat transferring contact with both said metallic walls, an outer plastic cover around the side walls of said container, and spring positioning means carried by said outer plastic cover and extending through the movable wall and guiding it with respect to the fixed wall, in combination with a loose fabric connecting the top ends of the fins and a side wall of said outer cover directing air flow to the interspace between the fins.

8. An apparel as set forth in claim 6 wherein said container has one open end removably housed in a detachable box-type enclosure having insulating walls with openings in the sides for air-flow and a solid bottom end of the size of the container, the arrangement providing for charging refrigerant into the metallic container when removed and placed in an upright position and for replacement of the container within said insulating enclosure, a spring-like element fastening said container and enclosure together and retaining them in close contact at the closed bottom end of the container, whereby the refrigerating unit thus constituted may be turned upside down and placed in position inside the garment.

9. A set of two refrigerating units placeable astride of the shoulder line within an insulated garment arranged to be spaced from the body of the wearer by interior ribs, each such unit consisting of a container made out of plastic material with a filling opening having a removable cover, and adapted to hold a replaceable charge of refrigerant, said units having free side walls in front and in back of the body with provision for inserting in each such wall a detachable heat conducting plate bearing a large number of heat conducting vertical fins integrally attached thereto by heat conducting joint means, and a metallic extension secured to the bottom part of each plate providing a channel type conduit at the bottom ends of the fins for catching condensed water vapor and conducting it to a suitable draining and starage member supported within said garment, in combination with a saddle shape support for said set of plastic containers comprising foam insulating material adapted to fit over the shoulder of the wearer, and side wall attaching and spacing means on each container for projecting into a pocket in the lining of the garment and supporting it in spaced relation to the body of the wearer to allow free flow of air cooled by said fins on both front and back surfaces thereof between said body and said refrigerating units, said saddle shape support and container side wall attaching and spacing means providing a secure positioning and supporting of the containers below the top line of the shoulders of the wearer and thereby reducing the height of the set of refrigerating units when assembled in operative position to promote comfort and facilitate normal movements of the wearer's head and arms.

10. A refrigerated apparel including a body garment and helmet of the character described having an opening at its top for air and provided with refrigerating means within an encircling band of fins and a plurality of detachable refrigerating units which are adapted to be taken out of the garment, in combination with supporting means having an adjustable extension part extending inside of the helment and providing a common support for the helmet and said detachable units adjustable to maintain said refrigerating units and helmet over a confined space, and an insulating cover detachably attached to the encircling band of the helmet and depending therefrom to enclose said confined space, thereby enabling cooling thereof by mingling the air cooled by the fins of the helmet with the air flowing from the open top of the helmet to the fins of the refrigerating units placed inside the helmet and also by the cold surface of its inside wall, thus enabling the utilization of such apparel when taken off by the wearer to cool many kinds of articles for promoting personal comfort.

11. A garment as claimed in claim 6 comprising an annular bottom end piece the outer margins of which are respectively adapted to be attached to the garment lining on the outer periphery, and to fit the wearer around the waistline on the inner periphery, which piece is provided with one-way valve devices including back pressure valve means permitting air to flow from the interspace into the ambient atmosphere and prevent the upward flow of warmer ambient air into such space, thus avoiding possible counteraction and reduction of the outgoing air flow.

12. A cooling apparatus for a bodily spaced head supported protective garment comprising a metal outer member, a head band for engaging the head of a wearer, an inner member spaced within said outer member and connected thereto at circumferentially spaced attachment points, a face and neck encircling garment depending from said outer member, circumferentially spaced metallic fins in heat conducting contact with the perimeter of said outer member, and providing channels for entrance of air within said garment, said outer member being provided with means for retaining at least one refrigerant containing a renewable charge in heat conducting relation with said fins, and insulating means between said outer member and the head of the wearer.

13. A cooling apparatus as claimed in claim 12 in combination with cooling apparatus supported within said garment below the neck of the wearer characterized by means for retaining at least one refrigerant containing a renewable charge.

14. A cooling apparatus as claimed in claim 13 wherein the cooling apparatus positioned below the neck of the wearer is provided with means for circulating cooled air upwards toward the neck of the wearer.

15. A cooling apparatus for personal wear comprising a head supported protective garment covering at least the upper part of the wearer's person, refrigerant retaining means and a support therefor within said garment and independent thereof, said refrigerant retaining means including at least one removable cartridge filled with a cooling mixture in frozen condition, a closed chamber associated with said refrigerant retaining means, and ducts leading therefrom for conducting cooled air towards the upper part of said garment, motor driven means for circulating said air through said ducts, and replaceable means for powering said motor driven means.

16. Cooling apparatus for a body garment comprising an outer covering and a closed chamber provided with means for collecting and refrigerating air, a duct leading from said chamber to a flexible tube, a small fan driven by a small electric motor with replaceable battery for conducting air through said flexible tube to selected parts of the body for cooling them, a manifold preferably made out of a round plastic tube, with orifices out of which the cold air is distributed in a plurality of jets, which is connected at the end of said flexible tube, said collection chamber and fan being adjustable for vertical and horizontal operation thereby avoiding the need for other refrigerating means heretofore deemed necessary.

17. Cooling apparatus as claimed in claim 16 wherein the blowing of cold air can be applied in very high temperature ambiences combined with insulated clothing completely surrounding the body and spaced from the body by ribs and the ducts and tubes being arranged to circulate the cooled air inwardly to all parts of the body.

18. A portable system of cooling air applicable to a living person, said system comprising at least one container in combination with a cooling apparatus utilizing a special refrigerant of the type which absorbs heat from the air, and produces by gravity difference between the cold and hot air, a downward flow of cooled air, an insulated garment spaced from the body of a wearer, and means for conducting such cold air around the space formed between said garment and said body, said special refrigerant being a mixture of elements which are in liquid state at normal ambient temperatures and are in a frozen state in the container of the cooling apparatus, said mixture containing an eutectic salt solution in water and alcohol mixture, said salts having the property of lowering the freezing point of water and having a negative heat of solution in water.

19. A portable system of cooling, as claimed in claim 18, wherein a refrigerant of the following composition is utilized, 65% sea water, 10% denatured ethylalcohol, 25% ammonium nitrate; which solution freezes at —10° F., and can be super-cooled to —35° F., providing a combined reserve of available refrigerating capacity of approximately 200 B.t.u./lb.

20. A system of refrigeration as claimed in claim 18 in which the absorption of heat from the ambient air is assisted by the use of Dry Ice in addition to the special refrigerant.

21. In a portable system of cooling, as set forth in claim 18, the variation of the temperature of cooling and the duration of the refrigerant by changing the proportional amounts of the components of the mixture and thereby controlling the rate of melting thereof.

References Cited in the file of this patent

UNITED STATES PATENTS

| | | |
|---|---|---|
| 2,335,630 | Bachardy | Nov. 30, 1943 |
| 2,496,296 | Lobl | Feb. 7, 1950 |
| 2,504,911 | Whitecar | Apr. 18, 1950 |
| 2,731,808 | Stark | Jan. 24, 1956 |

FOREIGN PATENTS

| | | |
|---|---|---|
| 455,283 | Great Britain | Oct. 15, 1936 |